United States Patent [19]

Grau et al.

[11] Patent Number: 4,825,904

[45] Date of Patent: May 2, 1989

[54] TWO POSITION FLOW CONTROL VALVE ASSEMBLY WITH POSITION SENSING

[75] Inventors: Richard Grau; Robert D. Vanderlaan, both of Kalamazoo; Guy S. Newell, Schoolcraft, all of Mich.

[73] Assignee: Pneumo Abex Corporation, Boston, Mass.

[21] Appl. No.: 182,349

[22] Filed: Apr. 18, 1988

[51] Int. Cl.4 ............................................. F16K 31/04
[52] U.S. Cl. ..................................... 137/554; 251/65; 251/129.11
[58] Field of Search ............................. 251/129.11, 65; 137/554

[56] References Cited

U.S. PATENT DOCUMENTS 4,577,832 3/1986 Sogabe ............................. 251/129.11
4,641,812 2/1987 Vanderlaan et al. ......... 251/129.11 X Primary Examiner—Arnold Rosenthal
Attorney, Agent, or Firm—Renner, Otto, Boisselle & Sklar

[57] ABSTRACT

A flow control valve assembly including a valve having open and closed positions and a limited angle torque motor having two angular rotor positions corresponding to the open and closed valve positions that are stable in the absence of an applied electrical signal. The valve motor includes magnetic pole pieces forming a concentric shell around the motor shaft that include air gaps, disposed generally parallel to the axis of rotation of the shaft. Pole blades adjacent the rotor are magnetically linked to the pole pieces by flanges disposed at the rotor ends. Two alternative minimum reluctance flux paths are provided for a permanent magnet that is mounted on the rotor with its poles transverse to the axis of rotation. The two minimum reluctance paths provide the stable rotor positions. A magnetic flux sensor disposed in or proximate one of the air gaps is employed with a relatively high frequency electrical signal to determine relative rotor and valve positon. A current signal is applied to the stator coil of the motor to actuate the valve. The interaction of the magnetic field of the permanent magnet with the fields produced by the low and higher frequency electrical signals generate the actuation and rotor position responses, respectively.

15 Claims, 5 Drawing Sheets

TWO POSITION FLOW CONTROL VALVE ASSEMBLY WITH POSITION SENSING

BACKGROUND OF THE INVENTION

This invention relates generally, as indicated, to a two position flow control valve assembly with position sensing, to provide for position monitoring of the valve position.

Certain military aircraft control systems are required to have better electric power efficiencies to reduce parasitic loads on the engines. Many solenoid and direct drive flow control valves are used in aircraft flight control systems as well as in other aircraft subsystems. Combined, these valves represent a significant power drain on the aircraft. Because present valves require continuous power to hold commanded positions, alternative types of valves, such as directional latching solenoids which hold their position without power, are used in some of these applications. Using these valves in aircraft systems requires position monitoring to allow the aircraft controller to know the state of the position of the valves.

Heretofore, the conventional way of determining valve position has been to couple a position measuring device to the valve element and add the necessary interfacing hardware and electrical wires.

SUMMARY OF THE INVENTION

This invention permits determining valve position or state without adding additional signal transmission wires and for integrating the measuring devices into the valve assembly with a minimum of additional parts. The direct drive valve position sensing implementations of the present invention are designed primarily for use in aircraft flight control systems which have redundancy in control components and control functions.

In accordance with one aspect of the invention, a simple and reliable valve drive mechanism is provided with an integral position sensing means to allow the system controller to know the position of the valve before and after a valve switching operation.

In accordance with another aspect of the invention, a simple integrated valve operating and valve position monitoring circuit is provided requiring only two wires per control channel to minimize the wiring complexity.

In accordance with another aspect of the invention, a simple and reliable electronic valve driver and position monitoring circuit with position sensing is provided for use with the two position valve assembly, which can have one or more electrical control channels or systems with varying degrees of redundancy requirements.

Further in accordance with the invention, a rotary force motor valve driver is provided which has two stable positions (open and closed), and which has a bias force holding the valve in the last position commanded by a polarized electrical command and which has a bias force after electrical power is removed.

In accordance with another aspect of the invention, the valve drive motor provides a position bias force which is generated by a magnetic force due to the presence of a permanent magnet in the system. The motor has a sensor using a bias magnet to allow full plus and minus range of operation. The valve position may be determined by the polarity direction of the driver current.

In accordance with still another aspect of the invention, the magnetic flux swing is desirably biased within a motor air gap such that it is at its lowest level at one extreme end of the motor rotation and highest level at the opposite end.

In accordance with yet another aspect of the invention, the sensing system does not require any additional transformer windings to isolate the position signal from the control signal.

A valve assembly achieving the objectives of the invention includes a direct drive motor having a rotatable shaft for opening and closing the valve. The motor has two different, stable positions when no electrical signal is applied to the motor. Also, the motor includes a stator having an electrical coil to which a direct current or low frequency signal is applied to generate a magnetic field. The magnetic field produced by a first electrical signal interacts with the magnetic field of a permanent magnet mounted on the motor shaft so that the valve can be actuated between its open and closed positions.

The motor stator is constructed so that the motor shaft, including its permanent magnet, experiences no net torque when the valve is in its open or closed position without any electrical signal being applied to the stator coil. The stator includes two or more magnetizable pole pieces having segmental air gaps therebetween. Magnetizable stator blades disposed next to the motor shaft are in magnetic communication with each other through magnetizable flanges extending from the blades to the pole pieces. The flanges are disposed at opposite ends of the pole pieces and extend radially inward from those pieces to contact the blades. The locations, relative sizes and shapes of the air gaps cooperate to produce two alternate magnetic flux paths that, in the absence of an electrical signal applied to the coil, produce no net torque on the motor shaft at two different angular positions of the shaft.

The motor incorporates a sensing means for detecting the position of the valve in response to a second electrical signal which may be applied to the same electrical leads used to energize the stator coil. A preferable position sensor includes a magnetic field intensity sensor for sensing the intensity of the magnetic field produced by a permanent magnet mounted on the shaft and so that its magnetic poles are disposed transverse to the axis of the shaft. The sensor may be an electrical coil wound on a magnetizable core, such as a saturable reactor. By applying a relatively high frequency signal to the electrical leads of the motor, the magnitude of the magnetic flux intercepted by the sensor can be determined. From that reactance measurement, the position of the valve can be determined. Position sensing is preferably not attempted at the same time valve actuation is under way. The respective impedances of the sensing coil and stator coil, combined with the different frequencies of the signals applied to actuate the valve and to determine its position, avoid undesired interactions. The magnetic sensor may be disposed within or adjacent to one of the magnetic pole air gaps and may include a biasing magnet to alter its response characteristics. It has been found that the flux in such air gaps is a measure of motor (valve) position, whereby the placement of a small saturable reactor at a desired position relative to one of such air gaps permits a relatively simple sensing circuit to be utilized for detecting valve position.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
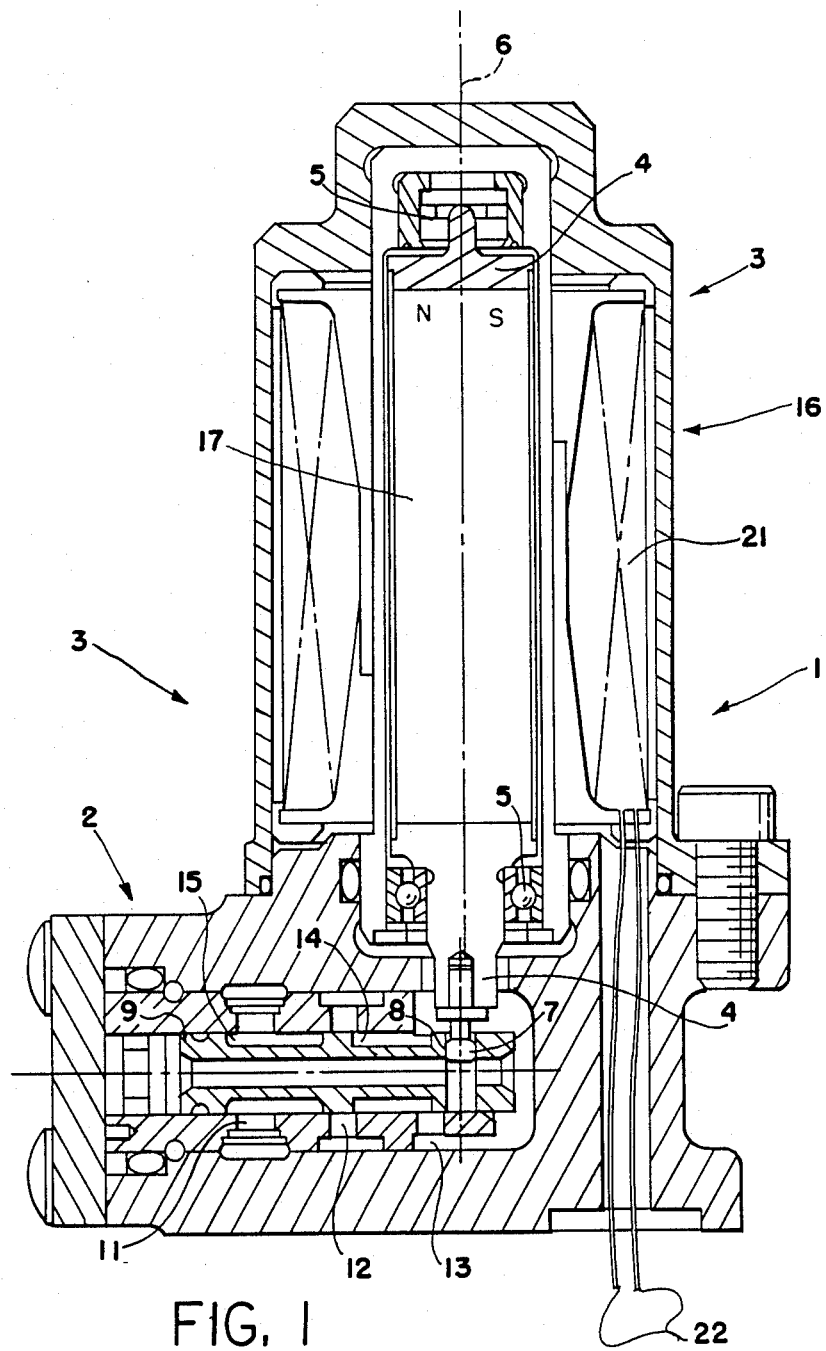
FIG. 1 is a schematic illustration of one form of valve assembly including a direct drive force motor and valve arrangement according to the invention.

FIG. 1 schematically illustrates one form of valve assembly 1 according to the invention including a two position control valve 2 and a limited angle torque motor 3 for driving same. Torque motor 3 includes a shaft 4 that is journaled at two locations along its length in bearings 5. The bearings permit rotation of shaft 4 about its length around an axis 6. At one end of shaft 4 is an eccentric drive member 7 which is received in a transverse opening 8 in the valve spool 9. Because of the eccentricity of drive member 7, which could alternatively be produced by an axially mounted drive member having a transversely extending eccentric at its end bearing on valve spool 9, rotation of shaft 4 produces a translation of valve 9.

The body of valve 2 includes a pressure port 11, a cylinder port 12, and a return port 13. Valve spool 9 includes the usual lands and grooves establishing fluid communication between cylinder port 12 and one of ports 11 and 13, depending upon the position of valve spool 9. In the closed valve position shown in FIG. 1, return port 13 is in communication through a groove 14 of valve spool 9 with cylinder port 12.

When shaft 4 is rotated through a limited arc, the eccentricity of drive member 7 allows valve spool 9 to translate to the right as viewed in FIG. 1, which results in the fluid disconnection of ports 12 and 13. Fluid communication is then established between pressure port 11 and cylinder port 12 through another spool groove 15. In this open position, pressurized hydraulic fluid flows from port 11 to port 12 in order to operate a hydraulic actuator or other mechanism in fluid communication with port 12.

The rotation of shaft 4 is brought about by the limited angle torque motor 3 of which shaft 4 forms the rotor. The stator 16 of the motor includes a coil 21 circumferentially and concentrically disposed around axis 6. A pair of leads 22 extends from coil 21 for applying a relatively low frequency or direct current electrical signal to the coil. That signal flowing through coil 21 produces a magnetic field. Shaft 4 has mounted on it a permanent magnet 17 having its poles disposed transversely to axis 6. The magnetic field produced by permanent magnet 17 interacts with the electromagnetic field produced by coil 21 when it is energized. If the fields are in opposition, shaft 4 is rotated so as to actuate the valve spool 9 from its open position to its closed position or vice versa. The polarity of the electrical signal applied to leads 22 determines whether shaft 4 turns clockwise or counterclockwise. One of the directions of rotation will cause the valve to open and the other will cause the valve to close.

The motor 3 including coil 21 and shaft 4 is constructed so that it is mechanically stable in both the open or closed positions. That is, when the valve 2 is open or closed, no net torque is applied to shaft 4 in the absence of an electrical signal applied to leads 22. (Valve 2 can be mounted on a frame or other electrically conducting base that provides one of leads 22. In that instance, it is only necessary that one wire lead physically protrude from the valve since the valve body functions as the second lead.) In addition, valve 2 includes a sensing means for determining the valve position. The construction of a valve motor having two stable positions and a position sensor is described in connection with the FIGS. 2–8.

Figure 2:
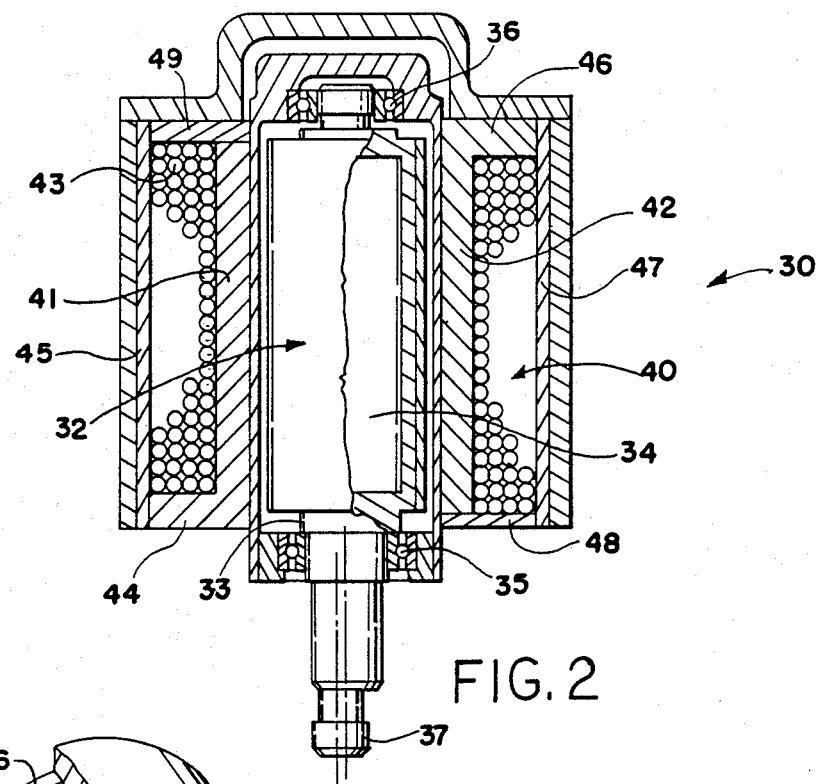
FIG. 2 is a more detailed fragmentary longitudinal section view of the motor of FIG. 1.

In FIG. 2 a detailed sectional view of a valve motor 30 according to the invention is shown. Valve motor 30 may be similar to that shown in U.S. Pat. No. 4,510,403, but includes significant differences that are important to the present invention. Motor 30 includes a rotor 32 having a shaft 33 including one or more permanent magnets 34. The magnetic poles of magnet 34 are disposed transverse to the axis of rotation of shaft 33. Shaft 33 is journaled for rotation at bearings 35 and 36. At the protruding end of shaft 33 an eccentrically mounted drive member 37 functions as eccentric 7 of FIG. 1.

Motor 30 includes a stator assembly 40 having a pair of opposed pole blades 41 and 42 about which a coil 43 is wound. Coil 43 corresponds to coil 21 of FIG. 1. Stator pole blades 41 and 42 are made of a magnetizable material such as soft iron. Stator coil 43 extends circumferentially around the magnetic pole blades substantially over their entire length. At the opposite ends of each blade, one magnetizable flange extends outwardly from each blade to contact a circumferential pole piece.

In FIG. 2, a flange 44 extends radially outward from stator blade 41 to contact a pole piece 45. Flange 44 is located at one end of stator blade 41. A second flange 46 extends radially outwardly from blade 42 to engage a second circumferential pole piece 47. Flange 46 lies at the end of stator blade 42 opposite flange 44. As described further below, pole pieces 45 and 47 are separated from each other by air gaps that are disposed parallel to the axis of rotation of shaft 33. As can be seen in FIG. 2, preferably each stator blade and its respective flange are unitary. Respective end plates 48 and 49 made of a non-magnetic material confine coil 43 at its ends opposite flanges 44 and 46. Additional non-magnetic components may be employed to house motor 30, but are not shown since they do not affect the electromagnetic operation of the motor.

Figure 3:
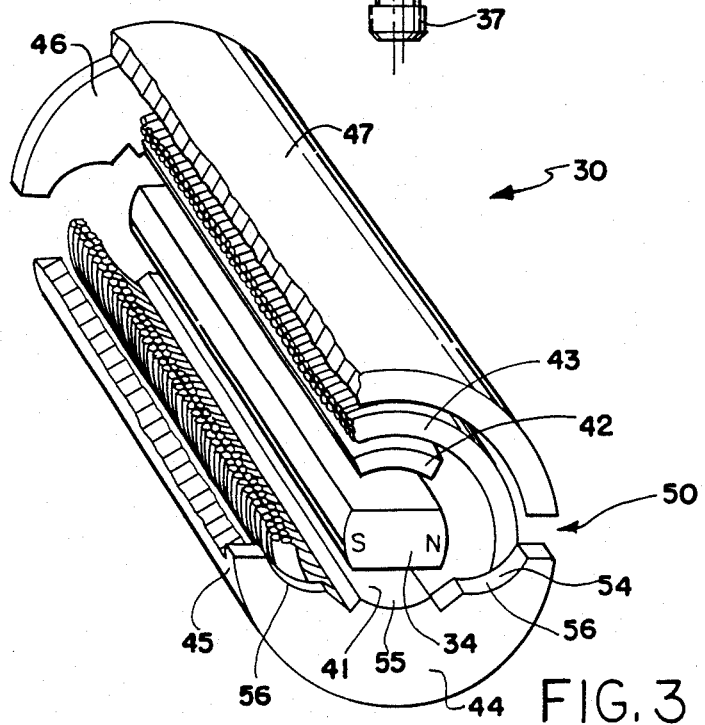
FIG. 3 is a partially sectioned perspective view of the motor of FIG. 2.

An embodiment of motor 30 is shown in a perspective, partially sectioned view in FIG. 3 to explain its operation further. Absent the presence of an electrical signal passing through coil 43, the interaction of the magnetic field produced by magnet 34 with the magnetizable material of the stator blades 41 and 42, stator blade flanges 44 and 46 and the circumferential pole pieces 45 and 47 determines the zero net torque position or positions of shaft 33. The magnetic flux produced by the magnet 34 flows, analogously to electric current, through the magnetic flux path offering the least reluctance, which is analogous to electrical resistance. The seeking by the magnetic flux of a path of minimum reluctance is exploited in the invention so that the shaft has two stable positions, either of which may be maintained when no electrical signal is applied to coil 43. If immediately after the cessation of current flow through coil 43 the shaft 33 is near one of those stable positions, it will assume that stable position and remain there until the appropriate electrical signal is applied to coil 43 to change the position of the shaft.

In FIG. 3, many of the elements of FIG. 2 are omitted for clarity. Like elements are given the same numbers in FIG. 2 and FIG. 3. Although a portion of pole pieces 45 and 47 have been removed in FIG. 3 to reveal the internal construction of the motor, opposed, symmetrical air gaps 50 and 51 (seen in FIG. 4) are disposed between those pole pieces. Flanges 44 and 46 are respectively disposed at the first and second ends of the motor measured along the direction of the axis of rotation of the rotor assembly. Flange 44 extends from pole piece 45 and engages pole blade 41. Likewise, flange 46 engages pole piece 47 and pole blade 42. The symmetry of the construction shown in FIG. 3 provides two stable, minimum reluctance positions for magnet 34.

Figure 4:
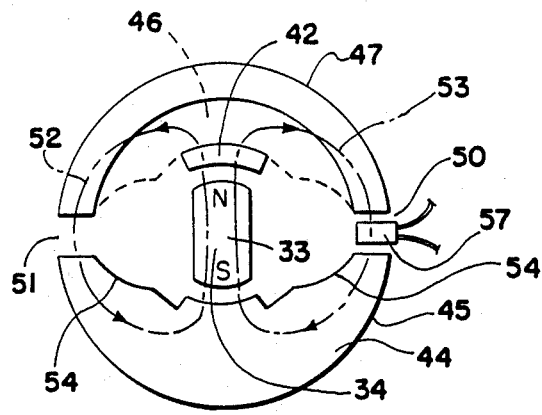
FIG. 4 is a simplified end view of the motor construction of FIG. 3 illustrating magnetic flux paths in the stable positions of the rotor.

In FIG. 4, a simplified view of the motor construction of FIG. 3 is shown. In order to aid understanding, in FIG. 4 flange 46 is shown in broken lines indicating its position at the distant end of the motor. In FIG. 4, magnet 34 is shown in one of its two stable positions. The symmetrical air gaps 50 and 51 are also shown in FIG. 4. Magnet 34 produces magnetic flux that travels through the lowest reluctance path from its magnetic north pole to its magnetic south pole. Flux paths 52 and 53 including arrows showing the direction of magnetic flux flow are drawn in FIG. 4. These paths illustrate the stability of the motor position (and that of its precise opposite) indicated. While in the drawing those flux paths appear to be planar, in actuality, the paths are three dimensional. Magnetic flux flows transversely through blade 42 to flange 46, then through pole piece 47, across air gaps 50 and 51 to pole piece 45 and thereafter through flange 44 back to the south pole of magnet 34.

The position of magnet 34 shown in FIG. 4 is stable because it involves the shortest total path through air. In air the magnetic reluctance is much higher than in the magnetizable material from which the pole blades, flanges and pole pieces are constructed. If magnet 34 were horizontal, rather than vertical as shown in FIG. 4, the magnetic flux would be forced to flow through relatively large air gaps. Because flux paths including shorter air gap segments are available, the horizontal position would produce a net torque on magnet 34. That torque would turn shaft 33 to assume either the position illustrated in FIG. 4 or the opposite position, with the north and south magnetic poles interchanged from the locations as shown in FIG. 4.

Magnetic flanges 44 and 46 have radially inward disposed surfaces. For example, flange 44 has a radially inward surface 54. By configuring that surface appropriately, a smaller air gap is presented to the poles of magnet 34 when they are opposite pole blades 41 and 42 than when they are different orientation. In the structure of FIG. 3, each of the radially inward surfaces of flanges 44 and 46 includes a central portion 55 that is generally concentric with the axis of rotation of magnet 34. The inward surfaces also include two similar, non-concentric, curved portions 56 outwardly disposed from the central portion. Because of the configuration given surface 54, the desired variation of the length of the air gap with magnet position is achieved. That desired variation causes the magnetic flux to drive magnet 34 toward one of its two stable positions in the absence of an electrical signal applied to coil 43.

An important feature of the present invention is the ability to detect the position of magnet 34 (and thus the motor shaft 33 and valve spool 9), when no electrical signal is being applied to coil 43 to change the position of the valve. That position is detected by measuring the intensity and/or direction of the magnetic flux in one of air gaps 50 and 51. A magnetic flux sensor 57 is disposed in or adjacent one of the gaps to measure magnetic flux intensity. (U.S. Pat. No. 4,510,403 discloses a magnetic motor having a rotor that can assume either of two stable positions. However, in that patent that desired result is achieved by eliminating the air gap between pole pieces. A non-existent air gap in the pole pieces prevents sensing of the magnetic flux flowing across the gap and through the pole pieces.) Magnetic sensor 57 may be a coil, especially a coil of wire wound on a core of a magnetizable material. The reactance of the coil varies with the magnitude and direction of the magnetic flux passing through the coil so that rotor position can be determined.

Figure 5A:
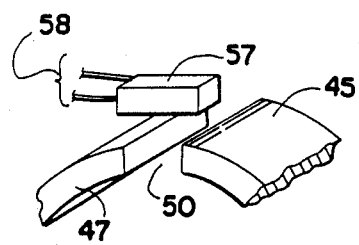
FIGS. 5A, 5B and 5C are schematic illustrations showing various positions of magnetic flux sensors with respect to stator air gaps, all according to the invention.
Figure 5B:
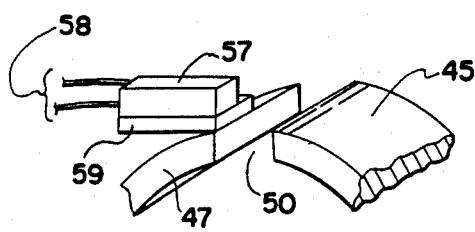
Figure 5C:
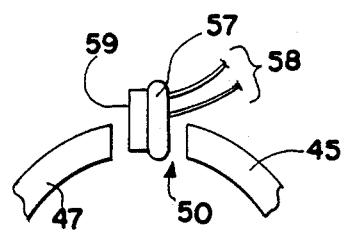

In FIGS. 5A, 5B and 5C various alternative positions of a flux sensor 57 relative to an air gap 50 between pole pieces 45 and 47 are illustrated. In each of FIGS. 5A, 5B and 5C, pole pieces 45 and 47 are partially shown with intervening air gap 50. A flux sensor coil 57 is shown disposed proximate air gap 50 in each of the figures. In FIG. 5A, sensor 57 is disposed just outside pole pieces 45 and 47, relative to shaft 33, and adjacent air gap 50. Sensor 57, which may be a coil or saturable reactor, has a pair of leads 58 for receiving a relatively high frequency interrogating signal. The frequency of that interrogating signal is high compared to the direct current or low frequency signal applied to stator coil 43 to rotate shaft 33. The high frequency signal is used to measure the reactance of the coil in sensor 57.

In FIG. 5B, the sensor 57 is placed adjacent gap 50. In FIG. 5C, the sensor coil is placed in a preferable position, directly between the pole pieces 45 and 47 and in air gap 50. FIGS. 5B and 5C both show a permanent magnet 59 mounted on sensor coil 57 to provide a biasing magnetic flux. A biasing permanent magnet is an important feature for a sensor for some motor embodiments, such as the embodiment of FIG. 4.

Because of the symmetrical construction of the motor shown in FIG. 4, the magnetic flux passing through sensor 57 is the same in either of the two stable positions of magnet 34. Therefore to determine shaft position and the position of a valve being driven by the motor, the direction of the magnetic flux must be determined. That flux is measured by measuring the impedance of flux sensor 57. The impedance of the flux sensor coil as a function of the angular position of magnet 34 is plotted in FIG. 6 as broken line 60. As indicated there, the magnitude of that impedance, with either the valve 9 of FIG. 1 open or closed, that is, with magnet 34 in either of its stable positions, is the same. In order to determine the direction of the flux passing through sensor 57, it is therefore necessary to measure the phase shift of the interrogating signal. That is, it is necessary to measure the complex impedance and not merely the magnitude of the impedance in order to determine the desired information.

Figure 6:
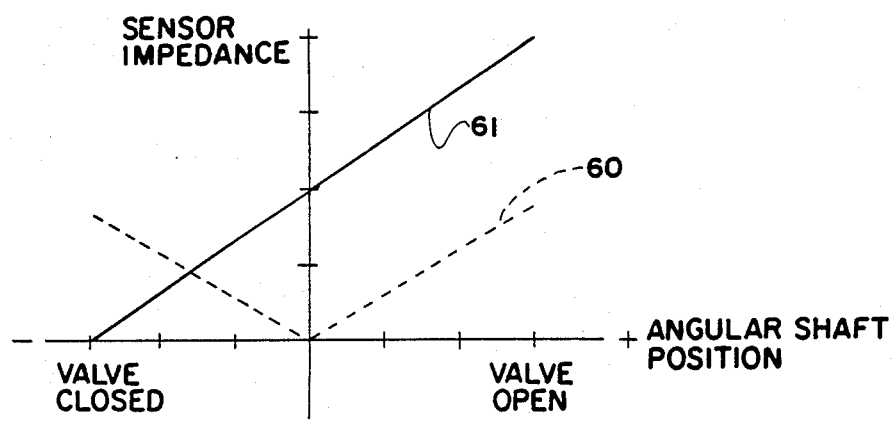
FIG. 6 is a graphic illustration of the response of a magnetic flux position sensor according to the invention without and with magnetic flux biasing.

By employing a biasing magnet 59 so that the direction of the flux passing through sensor 57 does not change regardless of motor shaft position, the response curve 61 shown in FIG. 6 can be obtained. In order to obtain this response curve, the biasing magnet 59 must produce a magnetic flux in the sensor 57 at least as large as the strongest magnetic flux that will pass through the sensor. If the biasing magnet is not strong enough, its effect will be to shift the discontinuity in curve 60 toward the left, but not to the left of the intersection of curve 61 with the abscissa. Response curve 61 permits an easy determination of the position of magnet 34 since one of the stable positions represents a high magnitude impedance and the other position represents a low magnitude impedance. The high-low measurement readily lends itself to employment in a digital electronically controlled apparatus.

It is also possible to construct embodiments of motors according to the invention employing asymmetrical air gaps, pole pieces and pole blades. An asymmetrical motor construction avoids any need for permanent magnet biasing a flux sensor disposed within an air gap. However, use of a biasing magnet is not excluded in an asymmetrical motor construction.

Figures 7, 8A, 8B:
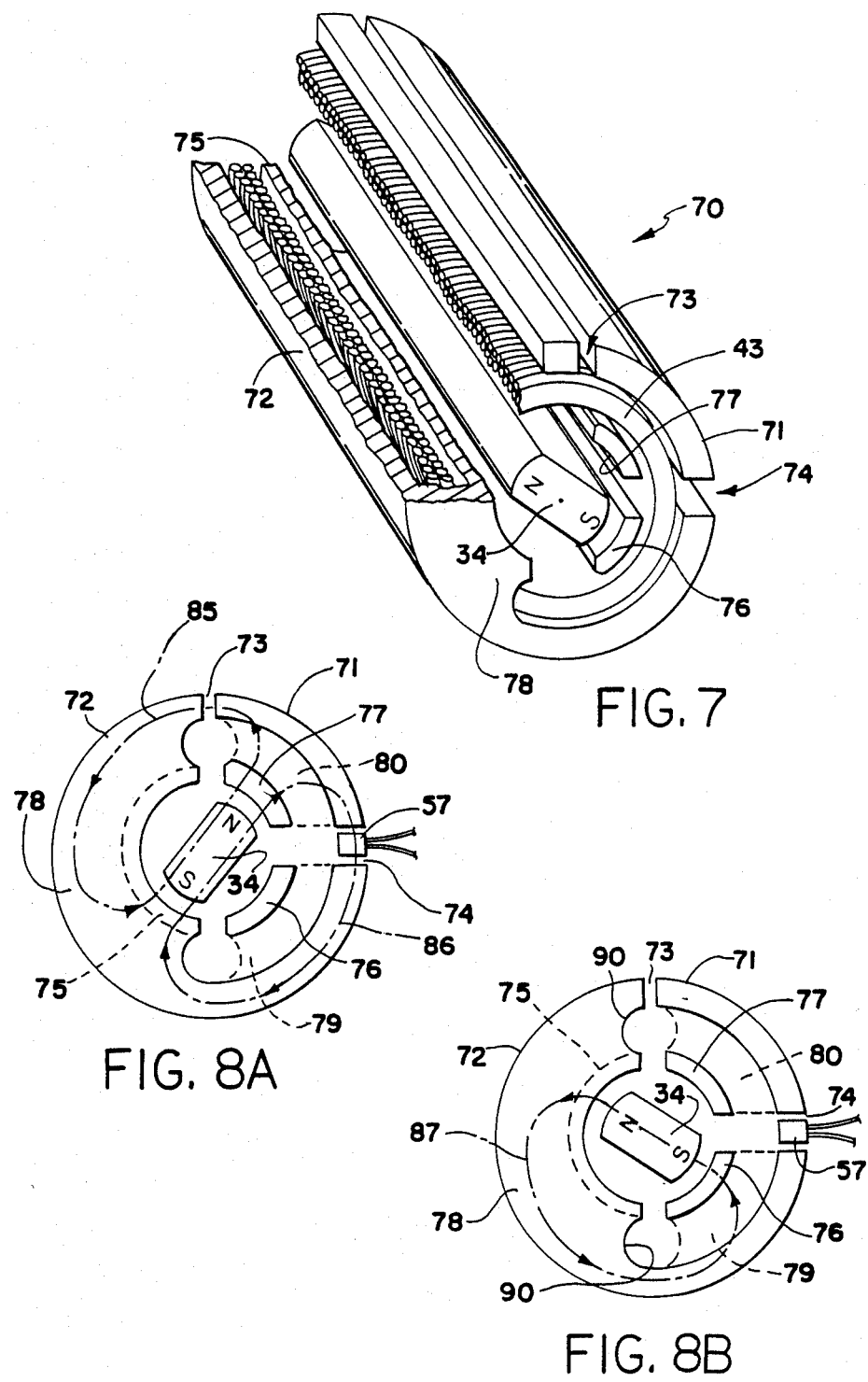
FIG. 7 is a partially sectioned perspective view of a modified form of motor construction for use in driving a valve according to the invention.
FIGS. 8A and 8B are simplified end views of the motor construction of FIG. 7 illustrating the magnetic flux paths for the two stable rotor positions.

A perspective, sectional view of an asymmetrical motor 70 is shown in FIG. 7. Simplified end views of that embodiment are shown in FIGS. 8A and 8B to demonstrate the flux paths when the motor shaft is in its two stable positions. Motor 70 includes two circumferential, but unsymmetrical, pole pieces 71 and 72. Pole piece 71 occupies approximately, but slightly less than ninety degrees around the axis of rotation of magnet 34. Pole piece 72 occupies approximately two hundred seventy degrees around the shaft. Between the pole pieces 71 and 72 are two air gaps 73 and 74 lying generally parallel to the axis of rotation of magnet 34. Air gap 74 is relatively large compared to air gap 73. This asymmetry contributes to the operation of motor 70.

Motor 70 may include a stator coil 43 identical to the coil described for motor 30. Coil 43 is generally concentric with the axis of rotation of magnet 34. Within coil 43 are disposed three pole blades 75, 76 and 77. A flange 78 extends from approximately one hundred eighty degrees of pole piece 72 and contacts pole blade 75. Preferably, pole piece 72, flange 78 and blade 75 are a unitary piece of the magnetizable material such as soft iron. At the opposite, second end of motor 70, blades 76 and 77 also are attached to flanges 79 and 80. Those flanges are not visible in FIG. 7, but are indicated by broken lines in FIGS. 8A and 8B to show that they lie at the far end of motor 70. Blade 76 is attached to flange 79 extending from pole piece 72, but at the second, far end of motor 70. That is, in this construction, both blades 75 and 76 are attached through flanges 78 and 79 to pole piece 72. Blade 77 is also attached at the distant or second end of motor 70, but through flange 80, is attached to pole piece 71.

The construction of motor 70 just described produces two stable positions for magnet 34. Those stable positions are illustrated in FIGS. 8A and 8B. In FIG. 8A, magnet 34 is aligned with its poles opposite blades 77 and 75. Two predominant flux paths 85 and 86 are produced. Although these paths appear to be planar in FIG. 8A, both include transverse components lying perpendicular to the plane of the figure. Flux path 85 passes from magnet 34 through blade 77 to flange 80, across air gap 73, to reach pole piece 72 through which it returns to magnet 34. Flux path 86 passes from the magnet 34 in the same initial direction through blade 77 and flange 80 to pole piece 71. Then flux path 86 crosses larger air gap 74 to reach pole piece 72 and return to magnet 34. A relatively large amount of magnetic flux passes through air gap 74 when magnet 34 is in the position shown in FIG. 8A. Thus the impedance of sensor 57 is relatively low when magnet 34 is in the position shown in FIG. 8A.

The other stable position of magnet 34 is shown in FIG. 8B. FIG. 8B shows a rotation of magnet 34 through approximately one hundred twenty degrees relative to the position of FIG. 8A, which is sufficient in a valve of the type shown in FIG. 1 to change its position from open to closed or vice versa. In FIG. 8B, one pole of magnet 34 is opposite blade 76 and the other pole is opposite a portion of blade 75. In this position, most of the magnetic flux produced by magnet 34 passes along path 87 through pole piece 72, blades 75 and 76 and flanges 78 and 79. That path passes through relatively short air gaps. By contrast, a second flux path would require passage through both air gaps 73 and 74. As a result, the alternative, second flux path has a relatively high reluctance and little of the magnetic flux from magnet 34 passes along that second path. Thus when magnet 34 is in the position shown in FIG. 8B, little external flux passes through sensor 57 and the sensor has its nominal, relatively high impedance.

In motor 70, sensor 57 provides high and low impedance indications of the two alternative stable magnet positions. Therefore, these positions can be readily distinguished with digital circuitry. As with motor 30, the radially inward surfaces of the flanges help determine the flux paths that produce stable rotor magnet positions. In motor 70, the inner surfaces of flanges 78, 79 and 80 are determined by the shapes of radial surfaces of pole blades 75, 76 and 77, respectively. Outwardly from these concentric blade portions of the flanges, each of the radial surfaces of flanges 78, 79 and 80 includes a curved end portion such as end portions 90 on flange 78 (see FIG. 8B). These end portions generally sharply depart from the pole blades toward the pole pieces to concentrate magnetic flux lines in the direction of the pole blades.

Figure 9:
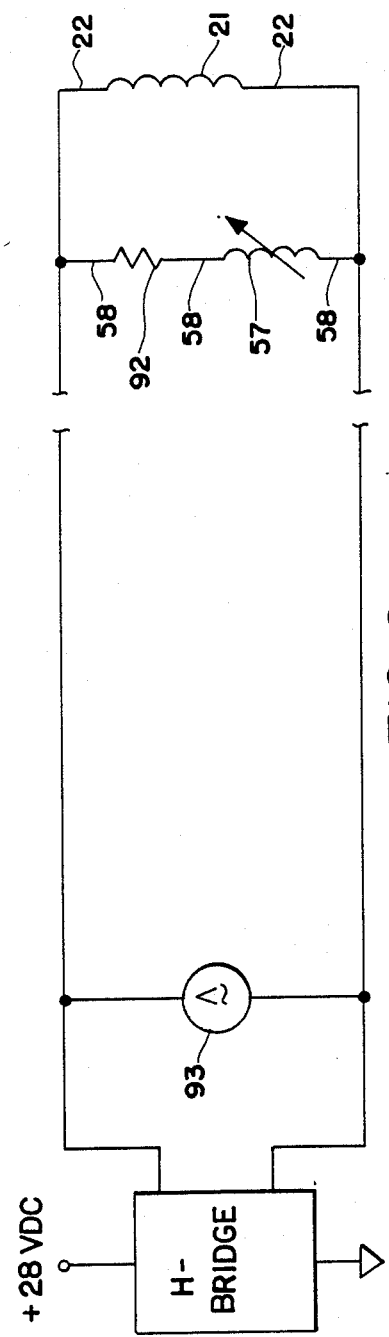
FIG. 9 is a schematic diagram of electrical circuitry for valve (motor) operating and position sensing in accordance with the present invention.

Motors 30 and 70 illustrate only two embodiments of permanent magnet motors incorporating air gaps in their pole pieces that are suitable for use in limited angle torque motor applications. With the journaled shafts and eccentric drives of FIG. 2, these motors are readily incorporated into hydraulic valves as in FIG. 1. Preferably, the electrical leads 58 from sensor 57 are connected in parallel with electrical leads 22 from the bi-stable motor driving coil 21 of motors 30 and 70 as schematically shown in FIG. 9. If desired, a protective resistor 92 may also be placed in series with the sensor 57 as further schematically shown in FIG. 9. When valve 2 is to be placed in a particular position, a relatively high frequency signal is sent to the leads by a constant RMS current source 93 whose voltage (±) is proportional to the sensor inductance. Because of the inductance of coil 21, little of that higher frequency signal enters the driving coil and most is directed to the sensor coil. The actual valve position is determined using the sensor coil 57. If the valve position is to be changed, then a pulse of a direct current or a relatively low frequency current of the appropriate polarity is supplied to the electrical leads. The pulse of current energizes coil 21 to produce a magnetic field that interacts with the magnetic field of magnet 34 and produces a torque that rotates shaft 4 to the desired position. Because of the relatively high resistance of the sensor coil, little of the direct current pulse is spent in the sensor coil. A one second current pulse is provided for motor drive. The voltage of the sensor interface circuit output is valid only when motor current is absent.

After the position of the valve has been changed, sensor 57 can again be interrogated to insure that the desired position has been achieved. As will be apparent, the eccentricity of the drive member 7 should be coordinated with the two stable positions of the motor and their angular difference so that each stable position corresponds to one of the open and closed positions of the valve. In that arrangement, the valve can and will maintain either of its two alternative positions without constant energization to sustain either of them.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

We claim:

1. A valve assembly incorporating a valve position indicator comprising a two position valve, electromechanical means, having two electrical leads, for actuating said valve between first and second positions in response to the application of a first electrical signal of a relatively low frequency or direct current to said leads, electromagnetic means for retaining said valve in either of said first and second positions in the absence of the application of such electrical signal to said leads, and sensing means for sensing the position of said valve in response to the application of a second electrical signal of a relatively high frequency to said leads.

2. The valve assembly of claim 1 wherein said electromechanical means comprises a motor including a shaft rotatable through a limited arc, a permanent magnet mounted on said shaft with its magnetic poles transverse to an axis of said shaft, and an end on said shaft having an eccentricity transverse to said axis, and said valve includes a valve spool engageable by said end to move said valve between said first and second positions in response to rotation of said shaft through such limited arc.

3. The valve assembly of claim 1 wherein said electromechanical means and said electromagnetic means comprise a motor including a shaft rotatable through a limited arc, said shaft having an axis along its length, and a permanent magnet mounted on said shaft with its magnetic poles transverse to said axis, a stator concentrically disposed about said axis including first and second stator blades made of a magnetizable material, a coil or wire circumferentially wound around said blades for conducting an electrical current to generate an electromagnetic field for interacting with said permanent magnet to apply a torque to said shaft, first and second pole pieces forming, with intervening first and second air gaps, a shell disposed around said coil radially outwardly from said shaft, said pole pieces being made of a magnetizable material and having opposed first and second ends relative to the length of said shaft, and first and second flanges made of magnetizable material and having radially inward shaped surfaces, said first flange extending from the first end of said first pole piece radially inwardly to contact said first blade, and said second flange extending from the second end of said second pole piece radially inwardly to contact said second blade, the shapes of said inward surfaces of said first and second flanges and said air gaps cooperating to produce magnetic flux paths producing substantially zero torque on said shaft at two different angular positions of said shaft.

4. The valve assembly of claim 3 wherein said sensing means comprises magnetic sensor means for sensing the intensity of the magnetic field in said first air gap produced by said permanent magnet to indicate the position of said shaft.

5. The valve assembly of claim 4 wherein said magnetic sensor means comprises a second electrical coil.

6. The valve assembly of claim 5 wherein said second electrical coil is disposed around a core of a magnetizable material.

7. The valve assembly of claim 5 wherein said sensor means is disposed within said first air gap.

8. The valve assembly of claim 5 wherein said sensor means is disposed proximate said first air gap.

9. The valve assembly of claim 4 including a second permanent magnet disposed proximate said sensor means for applying a magnetic flux bias to said sensor means.

10. The valve assembly of claim 3 wherein said first and second pole pieces and said first and second flanges are substantially identical.

11. The valve assembly of claim 10 wherein said first and second air gaps are substantially identical.

12. The valve assembly of claim 10 wherein each of said radially inward surfaces includes a central portion generally concentric with said axis and two similar non-concentric end portions outwardly disposed from said central portion.

13. The valve assembly of claim 3 including a third stator blade and a third flange, each made from a magnetizable material, said third flange having a radially inward surface, and said third flange extending from the second end of first pole piece radially inwardly to contact said third blade.

14. The valve assembly of claim 13 wherein said first and second air gaps are unequal and are disposed about ninety degrees apart relative said axis.

15. The valve assembly of claim 14 wherein said first air gap is larger than said second air gap and said second air gap is at least partially disposed between second and third flanges.

* * * * *